United States Patent [19]

Waeldele et al.

[11] Patent Number: 5,269,067
[45] Date of Patent: Dec. 14, 1993

[54] TEST SPECIMENS COMPOSED OF ROD SEGMENTS FOR CO-ORDINATE MEASURING INSTRUMENTS

[75] Inventors: Franz Waeldele; Eugen Trapet, both of Braunschweig, Fed. Rep. of Germany

[73] Assignee: Leitz Messtechnik GmbH, Wetzlar, Fed. Rep. of Germany

[21] Appl. No.: 842,168

[22] PCT Filed: Sep. 6, 1990

[86] PCT No.: PCT/DE90/00676

§ 371 Date: Mar. 31, 1992

§ 102(e) Date: Mar. 31, 1992

[87] PCT Pub. No.: WO91/03706

PCT Pub. Date: Mar. 21, 1991

[30] Foreign Application Priority Data

Sep. 11, 1989 [DE] Fed. Rep. of Germany ....... 3930223

[51] Int. Cl.⁵ .............................................. G01B 3/00
[52] U.S. Cl. .......................................... 33/502; 73/1 J
[58] Field of Search ............ 33/502, 503, 567, 567.1; 73/1 J, 1 R, 1 E

[56] References Cited

U.S. PATENT DOCUMENTS

| | | | |
|---|---|---|---|
| 2,409,817 | 10/1946 | Webber | 33/567 |
| 2,471,961 | 5/1949 | Jones | 33/567 |
| 4,364,182 | 12/1982 | Jones | 73/1 J |
| 4,389,785 | 6/1983 | Goldsmith et al. | 33/567 |
| 4,884,348 | 12/1989 | Zeller et al. | 33/502 |
| 4,923,155 | 5/1990 | Dainis et al. | 73/1 R |
| 4,932,136 | 6/1990 | Schmitz et al. | 33/502 |
| 4,962,591 | 10/1990 | Zeller et al. | 33/502 |
| 5,052,115 | 10/1991 | Burdekin | 33/502 |
| 5,111,590 | 5/1992 | Park | 33/502 |

FOREIGN PATENT DOCUMENTS

| | | |
|---|---|---|
| 863848 | 1/1953 | Fed. Rep. of Germany . |
| 3504464C1 | 4/1986 | Fed. Rep. of Germany . |
| 0209857 | 9/1986 | Japan ............ 33/502 |
| 643828 | 9/1950 | United Kingdom . |

OTHER PUBLICATIONS

H.-H. Schuüssler, Technisches Messen T.M., vol. 51, No. 3, Mar. 1984, pp. 83-95.

*Primary Examiner*—Thomas B. Will
*Attorney, Agent, or Firm*—Foley & Lardner

[57] ABSTRACT

The invention relates to the construction of specimens for coordinate measuring instruments. According to the invention, these consist of touchable reference elements, and rods, in particular of ball-rod structures, balls and rods being held in contact by spring forces, and the contact surfaces of the rods being adapted to the radius of the balls. This construction enables the specimens to be disassembled. It guarantees a high reproducibility of the dimension embodied by the center-to-center distance between the balls in conjunction with ease of disassembly of the complete specimen The advantages are that one-dimensional specimens of very great length can be formed by joining to one another rods and interposed balls, while in the case of two- and three-dimensional specimens the transport volume is substantially reduced. The calibration of the reference object is possible in a simple and accurate fashion via the separate one-dimensional calibration of the segments.

10 Claims, 3 Drawing Sheets

4 CRP rod lapped recessed

CRP rod

10 Recess for touching

TEST SPECIMENS COMPOSED OF ROD SEGMENTS FOR CO-ORDINATE MEASURING INSTRUMENTS

In industrial quality assurance, increasing use is being made of coordinate measuring instruments close to the point of production and even integrated in production. As in metrology rooms, it is necessary for the operators of the measuring instruments to ensure the maintenance of the permissible measurement uncertainty within the scope of equipment monitoring. This can be ensured only by regular monitoring measurements. The use of specimens for the measurements required for this purpose has become established in recent years. The simplicity and speed with which monitoring can be carried out using specimens may be adduced, in particular, as reasons for this: these are factors which are very important in the field of production.

In principle, in this monitoring process the dimensions determined by means of the coordinate measuring instrument to be checked are compared with the corresponding calibrated measured values. In the course of this, it is checked whether measurement errors are within the specified limits of accuracy. The description of a monitoring process is given, for example, in the draft of the VDI/BDE Guideline 2617 "Monitoring coordinate measuring instruments by means of specimens".

Specimens constructed in one, two or three dimensions already exist. The present prior art is represented in an overview in the contribution, entitled "Specimens for coordinate measuring instruments, machine tools and measurement robots", by H. -H. Schübler in Technisches Messen, Vol. 51, 1984, No. 3. Difficulties occurring in manipulation given the simultaneous occurrence of large dimensions and in the calibration of the specimens owing to excessively large masses limit their use to coordinate measuring instruments having measurement volumes that are smaller as a rule than 1 $m^3$. With existing specimens, the limits of the dimensions are 2500 mm for one-dimensional design, and approximately 800 mm for the largest side length for two- or three-dimensional design.

It is the object of the present invention to propose specimens which are also suitable for monitoring coordinate measuring instruments having large measurement volumes, and in the process simultaneously ensure ease of manipulation and simple and reliable calibration.

This object is achieved according to the invention by the characterizing features of claim 1. The subclaims relate to advantageous further developments.

DETAILED DESCRIPTION OF THE PREFERRED EMBODIMENTS

In this case, advantages attach to those specimens which the user can disassemble and rejoin, while maintaining accuracy. The specimens consist of reference elements which are held at a defined distance by means of rod connections. It is possible in this way to build up on-, two- and three-dimensional structures (specimens). The reference elements are constructed in such a way that their position can be uniquely detected by the coordinate measuring instrument to be checked.

Balls, for example precision balls made of industrial ceramic, are preferably suitable as reference elements. Rods can be produced from, for example, invar, Zerodur or carbon fiber composite.

According to the invention, a connection of rods and balls that can be reproduced with a high degree of accuracy is achieved by precise machining of the rod ends with the ball radii (for example CNC machining and subsequent lapping with balls of the same radius). Balls and rods are pressed together by means of spring force; this results in a dimensional stability of the total structure which is comparable with that of specimens produced from one piece. The advantage of spherical, and thus large, contact surfaces resides in the relative insensitivity of the transition dimension with respect to varying pressure forces. Such varying forces are unavoidable in use and in the case of calibration, if the specimen is envisaged for repeated disassembly and joining.

According to the invention, it is possible to have different constructions of the resilient elements at the connecting points between the reference elements and the rods, to be precise:

by means of resilient clamps which, working from outside the rods and reference elements, press said rods and elements together (one clamp for each transition or else for several being possible), by means of springs which are located in the interior of the rods and/or the reference elements and draw the two together, by means of springs which act in relation to a support.

Figure 1:
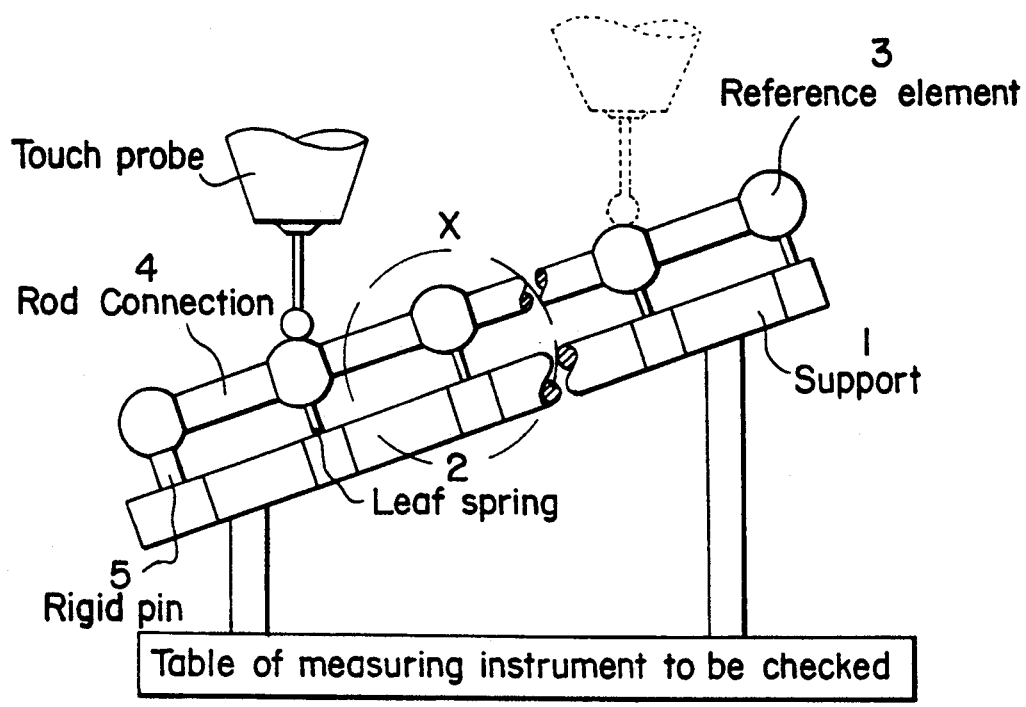
FIG. 1 shows a one-dimensional specimen.
Figure 1A:
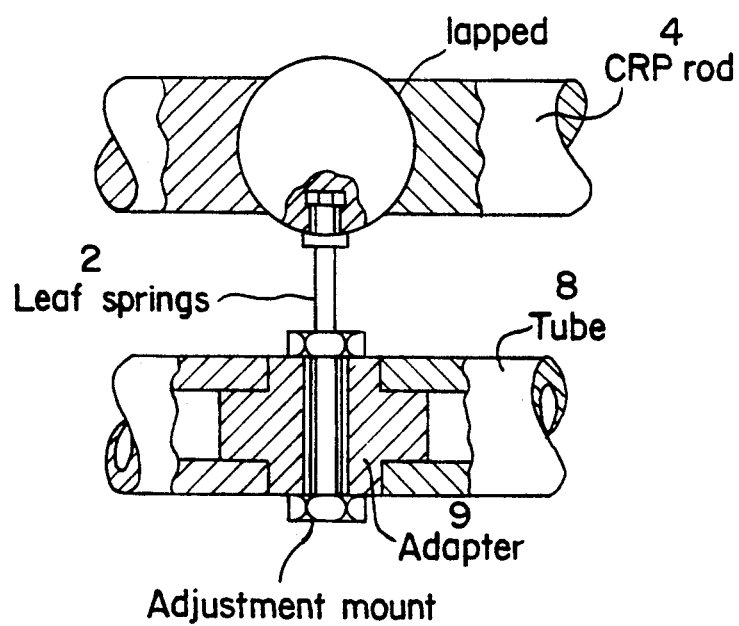
FIG. 1A is an enlarged detail of the area X in FIG. 1.

FIG. 1 shows a one-dimensional specimen according to the invention. The one-dimensional specimen includes a segmented support (1) that can be disassembled and on which balls are mounted as reference elements (3) with the aid of leaf springs (2), and of carbon fiber rods (4) which are clamped between the balls. For the purpose of establishing the reference point, one ball is attached to the support with a rigid pin (5) instead of with a leaf spring. The springs allow only a displacement of the balls in the axial direction of the rods and are biased in such a way that the pressure forces are approximately equally large at all transition points. The support is built up in a modular fashion. Its construction from tubes (8) and adapters (9) is shown in FIG. 1A. The adapters support the reference elements and are joined to the tubes via clamping connections.

The calibration of the rod-ball combinations can be performed individually. Since balls of one production batch have the same diameter to a very close tolerance, the calibration of all the rods can be performed in combination with the same pair of balls. According to the invention, the accuracy and stability of the support is of subordinate importance, since it is only the *distances* between two adjacent balls that are evaluated, and the rod axes form a line with the ball centers. Although the one-dimensional, segmented specimen is calibrated in sublengths, the total calibration error corresponds to the error which would arise for a non-segmented specimen of corresponding total length in the event of a single length measurement. The reason for this is that the error involved in the determination of a ball center has an effect on the two sublengths adjacent to the ball that is the same in magnitude but inverse in sign. There is thus no error accumulation.

Errors which arise due to a varying or inexact alignment of the ball centers are generally negligible. They respectively represent the cosine error in the length determination of a segment which arises due to the error in the checked coordinate measuring instrument that is effective orthogonally to the specimen axis.

Figure 2:
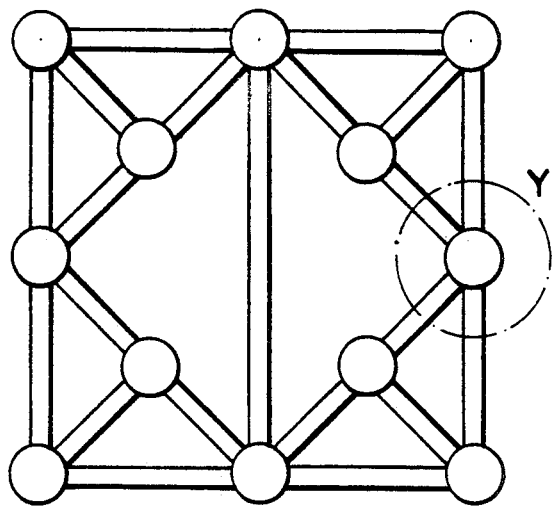
FIG. 2 shows a two-dimensional specimen.
Figure 2A:
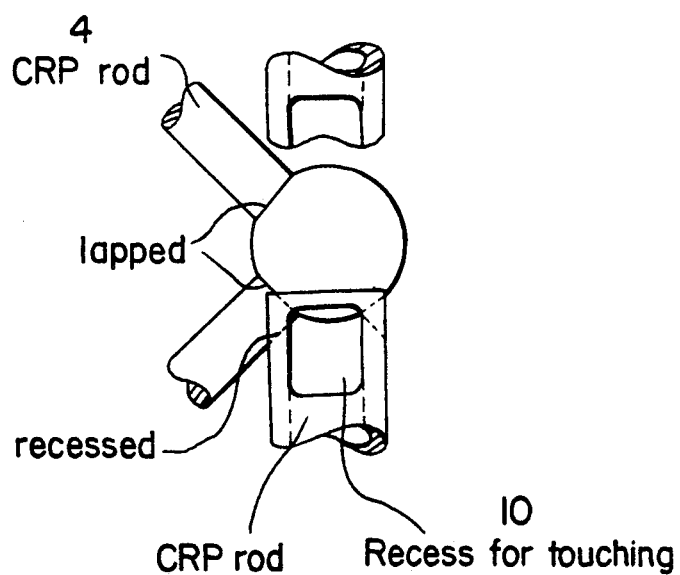
FIG. 2A is an enlarged detail of the area Y in FIG. 2.

FIGS. 2 and 2A show by way of example the construction of a two-dimensional specimen. Since the surfaces of individual reference elements are largely covered by the attachment of the rods, specific rods must have a recess (10) which enables the reference elements to be touched.

Figure 3:
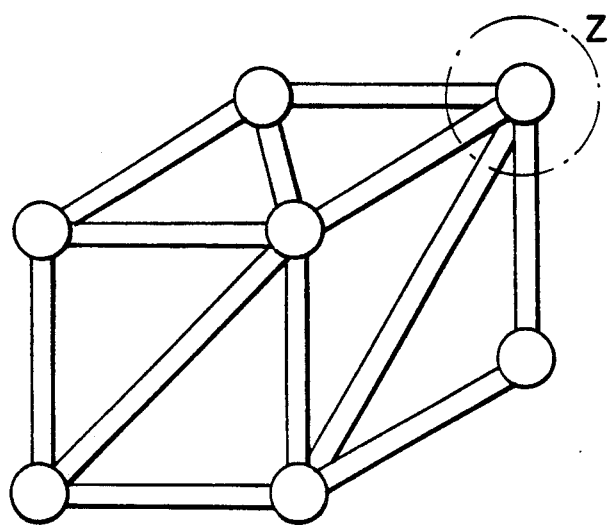
FIG. 3 shows a three-dimensional specimen.
Figure 3A:
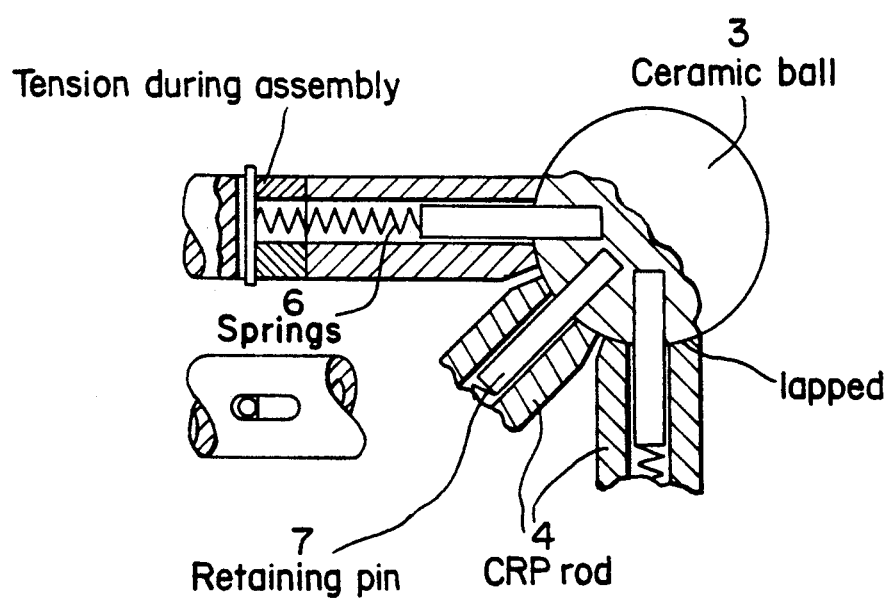
FIG. 3A shows an enlarged detail of the area Z in FIG. 3.

FIGS. 3 and 3A represent he construction according to the invention of a three-dimensional specimen in the form of a cuboid. The carbon fiber rods (4) here form with the ceramic balls (3) both the dimension-forming and the supporting structure, since the corner points of a cuboid are uniquely determined by 18 distances, which correspond here to 18 rods (4). It is thus reasonable to attach the pressure springs (6) directly between balls and rods. The pressure springs are attached here in the rods. Pins (7) glued in the balls serve to attach these springs to the balls and have, moreover, the task of stabilizing the cuboid during manipulation and assembly. In the state ready for measurement, the pins (7) do not touch the bore walls in the rods.

The essential advantages of such a cuboid reside in the simplified transport in the disassembled state, and in the good calibration capability of the one-dimensional substructures. Cuboids of up to approximately 2 m can be effectively manipulated. It may be necessary in the case of relatively large measurement volumes to be checked to carry out follow-up measurements with repeatedly displaced cuboids The following can be adduced as economic aspects in favour of the construction according to the invention of a specimen in a segmented rod design:

cost-effective production from components on the market light design by virtue of the use of rod structures for the dimension-determining components economic use of high-grade materials because of the low material consumption reliable measurement (and thus reduction of wastage) due to the use of high-grade materials which are thermally stable in the production environment simplified calibration of high accuracy, since the measurements can be carried out separately for the one-dimensional subsegments on correspondingly small, highly accurate reference measuring instruments (for example comparator with laser interferometer)

simple transport good manipulability.

The result of these factors is that the regularly required monitoring measurements can be carried out on measuring instruments rapidly and simply, that is to say in a cost-effective fashion, as well as reliably by using specimens, measurement instruments having large measurement volumes also being included. The design of the specimens according to the invention thus also makes possible their use in the case of measuring instruments used close to the point of production and integrated in production.

What is claimed is:

1. A specimen having reference elements constructed as balls and having length-stable rod segments which are connected to one another via the balls, characterized in that the reference elements are detachable mounted on the rod segments and contact surfaces of the rod segments, with respect to the balls, are constructed spherically with the same radius as the balls.

2. A specimen according to claim 1, characterized in that there are provided, for the purpose of detachably mounting the balls with the rod segments, first resilient elements which connect the balls to the rod segments with a defined pressure force.

3. A specimen according to claim 2, characterized in that the first resilient elements are let into the interior of the rod segments and fixed, and each ball has at least one pin for mounting the first resilient elements.

4. A specimen according to claim 2, characterized in that the first resilient elements are constructed as resilient clamps.

5. A specimen according to claim 1, characterized in that a support is provided which has individual tubes and adapters which are mounted on one another detachably and further characterized in that the reference elements are mounted on the support.

6. A specimen according to claim 5, characterized in that at least one adapter has a rigid pin attached to at least one reference element and the remaining adapters each have a resilient element, and the reference elements are arranged on the resilient elements.

7. Specimen according to claim 6, characterized in that the detachable mounting of the balls with the rod segments is constructed as a resilient clamp.

8. A specimen according to claim 1, characterized in that the balls are arranged with the rod segments as two-dimensional bodies in the X- and Y-direction.

9. A specimen according to claim 1, characterized in that the balls are arranged with the rod segments as three-dimensional bodies in the X-, Y- and Z-direction.

10. A specimen according to claim 6, wherein the resilient elements include leaf springs.

* * * * *